(12) United States Patent
Tomikawa et al.

(10) Patent No.: US 7,184,097 B2
(45) Date of Patent: Feb. 27, 2007

(54) ON-SCREEN DISPLAY APPARATUS (75) Inventors: Yasuhiko Tomikawa, Kyoto (JP); Tomohiro Okuno, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 349 days.

(21) Appl. No.: 10/022,849

(22) Filed: Dec. 20, 2001

(65) Prior Publication Data

US 2002/0075410 A1   Jun. 20, 2002

(30) Foreign Application Priority Data

Dec. 20, 2000   (JP) ............................. 2000-386629

(51) Int. Cl.
  H04N 5/18 (2006.01)
  H04N 5/16 (2006.01)
  H04N 5/50 (2006.01)
  H04N 9/68 (2006.01)
  H04N 9/79 (2006.01)

(52) U.S. Cl. .................. 348/569; 348/689; 348/691; 348/695; 386/10

(58) Field of Classification Search ................ 348/569, 348/689, 691–698, 673, 677; 386/10, 19; H04N 5/16, H04N 5/18, 5/202, 5/24
See application file for complete search history.

(56) References Cited

U.S. PATENT DOCUMENTS

| 4,254,434 | A | * | 3/1981 | Suzuki | 348/584 |
|---|---|---|---|---|---|
| 4,301,474 | A | * | 11/1981 | Jurgensen et al. | 348/694 |
| 5,341,218 | A | * | 8/1994 | Kaneko et al. | 348/695 |
| 5,596,374 | A | * | 1/1997 | Sumiyoshi et al. | 348/673 |
| 5,708,482 | A | * | 1/1998 | Takahashi et al. | 348/695 |
| 5,760,844 | A | * | 6/1998 | Jorden | 348/691 |
| 5,815,215 | A | * | 9/1998 | Yang | 348/569 |
| 5,841,488 | A | * | 11/1998 | Rumreich | 348/694 |
| 5,907,369 | A | * | 5/1999 | Rumreich et al. | 348/566 |
| 5,995,166 | A | * | 11/1999 | Kawano | 348/691 |
| 6,069,660 | A | * | 5/2000 | Sato | 348/379 |
| 6,281,943 | B1 | * | 8/2001 | Kim | 348/656 |
| 6,388,713 | B1 | * | 5/2002 | Saiki et al. | 348/553 |
| 6,411,330 | B1 | * | 6/2002 | Purcell et al. | 348/180 |
| 6,490,002 | B1 | * | 12/2002 | Shintani | 348/569 |
| 6,556,254 | B1 | * | 4/2003 | Palmero | 348/678 |
| 6,577,348 | B1 | * | 6/2003 | Park | 348/554 |
| 6,650,371 | B1 | * | 11/2003 | Morrish et al. | 348/569 |
| 6,750,920 | B1 | * | 6/2004 | Yeung et al. | 348/677 |
| 2002/0015029 | A1 | * | 2/2002 | Mizushima et al. | 345/204 |

* cited by examiner

*Primary Examiner*—Brian P. Yenke
(74) *Attorney, Agent, or Firm*—Steptoe & Johnson LLP (57) ABSTRACT

The present invention provides an on-screen display apparatus which can eliminate variations in the DC level at a time when an input chroma signal and an OSD chroma signal are switched, and prevent an erroneous display of color. The on-screen display apparatus of the present invention comprises a voltage holder which holds a voltage value at a time when the input chroma signal is a null signal, and an output switch which outputs the voltage value held by the voltage holder in an OSD period and outputs the input chroma signal other than the OSD period.

10 Claims, 11 Drawing Sheets

Fig.3 (a) screen display

Fig.3 (b) input luminance signal

Fig.3 (c) input chroma signal

Fig.3 (d) output chroma signal

Fig.3 (e) hold timing switch

Fig.3 (f) output switch

Prior Art

Fig.8 (a) screen display

Fig.8 (b) input luminance signal

Fig.8 (c) output luminance signal

Fig.8 (d) luminance signal output switch

Prior Art

Fig.9 (a) screen display

Fig.9 (b) input chroma signal

Fig.9 (c) output chroma signal

Fig.9 (d) chroma signal output switch

Fig.10 Prior Art

Prior Art

Fig.11 (a)
input chroma signal color burst signal

OSD output period

Fig.11 (b)
output chroma signal

VOB

ON-SCREEN DISPLAY APPARATUS

FIELD OF THE INVENTION

The present invention relates to an on-screen display apparatus which superimposes characters, menus or the like upon an input video signal, especially upon a chroma signal.

BACKGROUND OF THE INVENTION

In recent years, upsizing of the television has been progressed and high image-quality video recording/playback devices using the DVD or the like have penetrated the market, whereby high image-quality video signals have been demanded. Accordingly, in the market, the share of video devices conforming to S-Video signals (luminance signals and chroma signals) is increasing for the purpose of preventing the degradation of signals due to separation of the signals into luminance signals and chroma signals.

Further, for recent video devices, an on-screen display (hereinafter, abbreviated as OSD) function of multiplex-displaying characters, control menus or the like on a screen is an essential function to improve the operability of complicated devices. Therefore, the OSD function is essential also to the video devices conforming to the S-Video signals.

Hereinafter, a prior art OSD device will be described with reference to figures.

Figure 7:
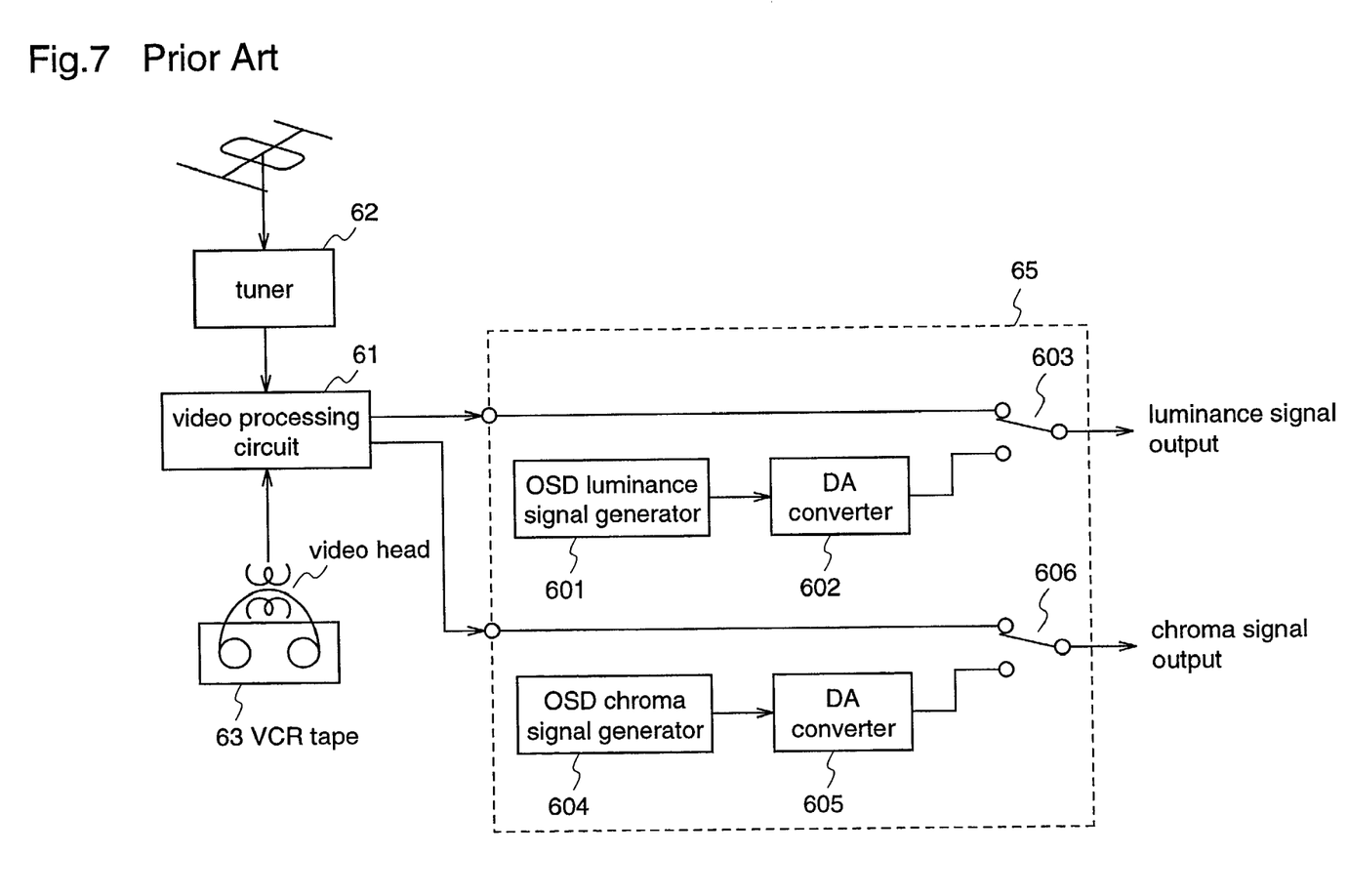
FIG. 7 is a block diagram illustrating a structure of a prior art OSD device.

FIG. 7 is a block diagram illustrating a structure of the prior art OSD device. Here, the description will be given of a case where S-Video signals from broadcast waves or a VCR tape are inputted to the OSD device as video sources.

In FIG. 7, a video processing circuit 61 receives a video signal inputted from a tuner 62 or a video signal recorded on a VCR tape 63, and outputs an S-Video signal.

The prior art OSD device 65 superimposes an OSD luminance signal and an OSD chroma signal upon a luminance signal and a chroma signal as the S-Video signal inputted from the video processing circuit 61, respectively, or generates all luminance signals and chroma signals by itself.

This prior art OSD device 65 comprises an OSD luminance signal generator 601 for generating an OSD luminance signal as a digital value; a DA converter 602 for converting the OSD luminance signal into an analog signal; a luminance signal output switch 603 that selects and outputs the output of the DA converter 602 in an OSD period, and selects and outputs the input luminance signal other than the OSD period; an OSD chroma signal generator 604 for generating an OSD chroma signal as a digital value; a DA converter 605 for converting the OSD chroma signal into an analog signal; and a chroma signal output switch 606 that selects and outputs the output of the DA converter 605 in the OSD period, and selects and outputs the input chroma signal other than the OSD period.

Next, the operation of the prior art OSD device will be described.

FIGS. 8(a) to 8(d) are diagrams for explaining a case where on-screen display (OSD) is performed on a luminance signal.

The description is given of a case where an OSD image is displayed along a horizontal dashed line in FIG. 8(a). In FIG. 8(a), input video other than the OSD image is not displayed while it is assumed that predetermined input video is displayed behind the OSD image.

FIG. 8(b) is a waveform diagram showing an input luminance signal. FIG. 8(c) is a waveform diagram showing an output luminance signal. FIG. 8(d) is a waveform diagram for explaining the operation of the luminance signal output switch 603.

During a period in which no OSD image is displayed on the screen, i.e., during a period other than the OSD period, the luminance signal output switch 603 selects the luminance signal input terminal side, and thus an input luminance signal is outputted as it is.

On the other hand, during a period in which the OSD image is displayed on the screen, i.e., during the OSD period, the luminance signal output switch 603 selects the DA converter 602 side, and thus an OSD luminance signal which has been generated by the OSD luminance signal generator 601 and converted into an analog signal by the DA converter 602 is outputted.

Therefore, the signal outputted from the luminance signal output switch 603 has a waveform shown in FIG. 8(c).

FIGS. 9(a) to 9(d) are diagram for explaining a case where black-and-white OSD is performed on a chroma signal.

Also in this case, the description is given of a case where an OSD image is displayed along a horizontal dashed line in FIG. 9(a), like in the case of the luminance signal. In FIG. 9(a), input video other than the OSD image is not displayed, but it is assumed that predetermined input video is displayed behind the OSD image.

FIG. 9(b) is a waveform diagram showing an input chroma signal. FIG. 9(c) is a waveform diagram showing an output chroma signal. FIG. 9(d) is a diagram for explaining an operation of the chroma signal output switch 606.

During a period other than the OSD period, the chroma signal output switch 606 selects the chroma signal input terminal side, and thus the input chroma signal is outputted as it is.

On the other hand, during the OSD period, the chroma signal output switch 606 selects the DA converter 605 side, and thus the OSD chroma signal which has been generated by the OSD chroma signal generator 604 and converted into an analog signal by the DA converter 605 is outputted.

Therefore, the signal outputted from the chroma signal output switch 606 has a waveform as shown in FIG. 9(c). During the black-and-white OSD period, AC components of the input chroma signal are not required and the outputted chroma signal is a DC voltage from the DA converter 605.

Figure 8:
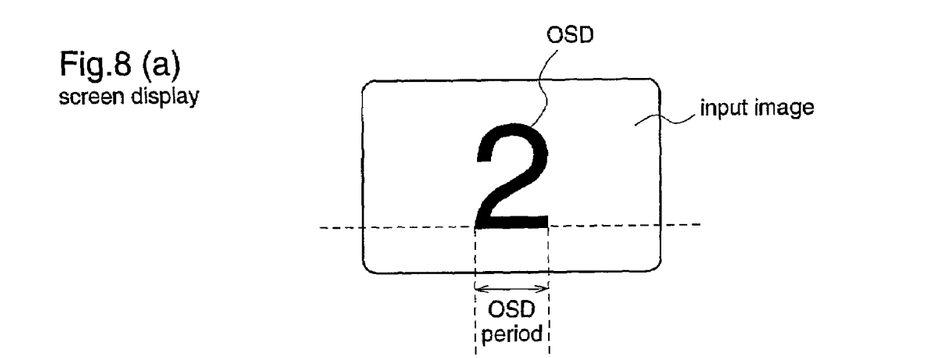
FIGS. 8(a) to 8(d) are diagrams for explaining a case where OSD is performed on a luminance signal in the prior art OSD device.
Figure 9:
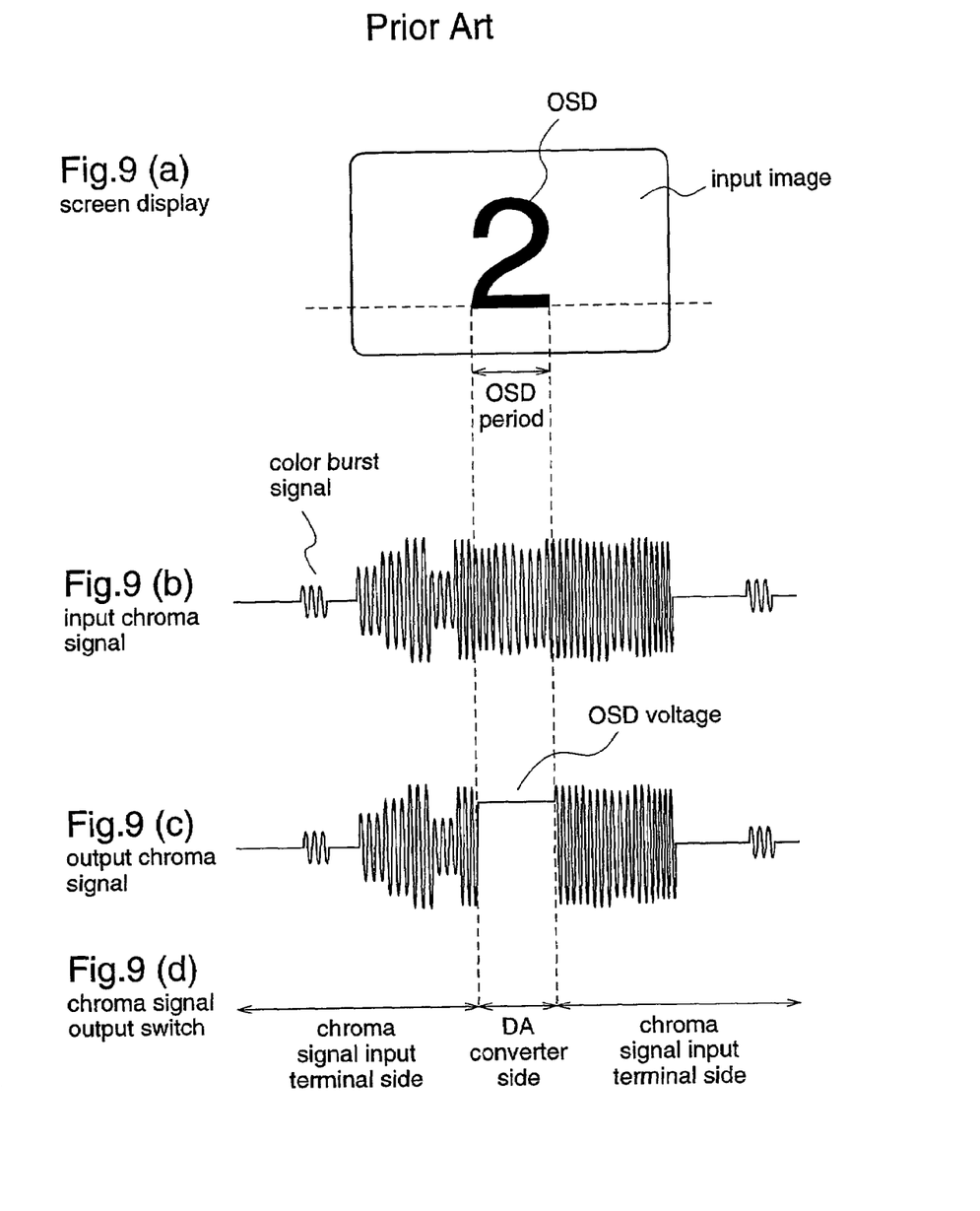
FIGS. 9(a) to 9(d) are diagrams for explaining a case where OSD is performed on a chroma signal in the prior art OSD device.

In the above descriptions with reference FIGS. 8 and 9, the case where the OSD luminance signal or chroma signal is superimposed upon an externally inputted luminance signal or chroma signal has been explained. However, there is a case where the OSD device 65 generates all luminance signals and chroma signals. In this case, the luminance signal output switch 603 and the chroma signal output switch 606 always select the DA converters 602 and 605 sides, and the video signals generated by the OSD luminance signal generator 601 and the OSD chroma signal generator 604 are outputted.

In the prior art OSD device, the DC level at a time when an input chroma signal is a null signal, i.e., when the input chroma signal includes no color burst signal and no color signal depends on the video processing circuit 61 shown in FIG. 7. On the other hand, the DC level in the OSD period is decided by the OSD device 65 shown in FIG. 7. When both of the supply voltages are different or when a voltage division circuit has variations, the potential is produced between the DC level when the input chroma signal is a null signal and the DC level when the OSD apparatus outputs a chroma signal. Accordingly, the prior art OSD device has following problems.

Hereinafter, the description will be given of a case where a chroma signal upon which an OSD image is superimposed is amplified.

Figure 10:
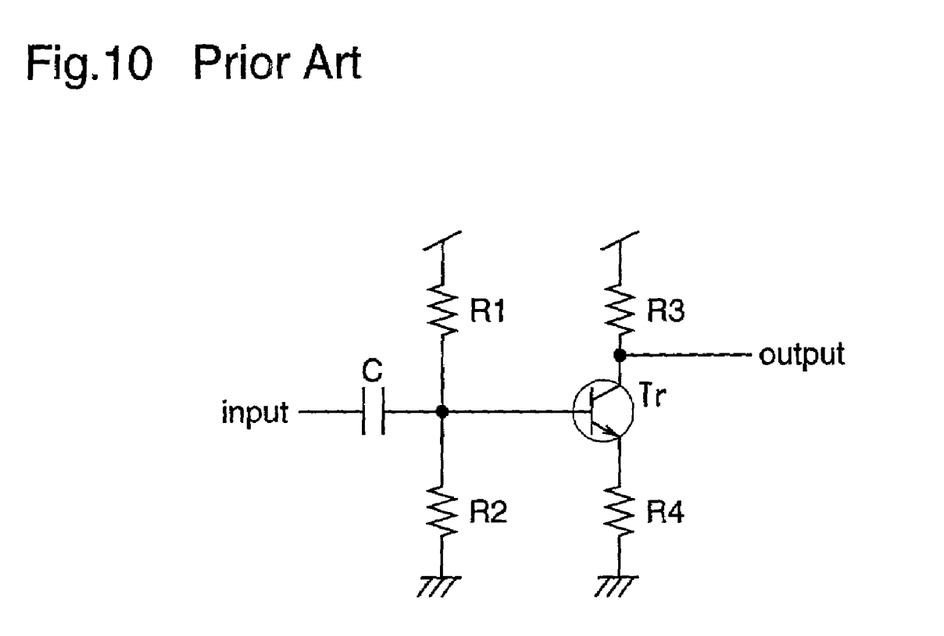
FIG. 10 is a circuit diagram illustrating an example of an amplifier circuit.
Figure 11:
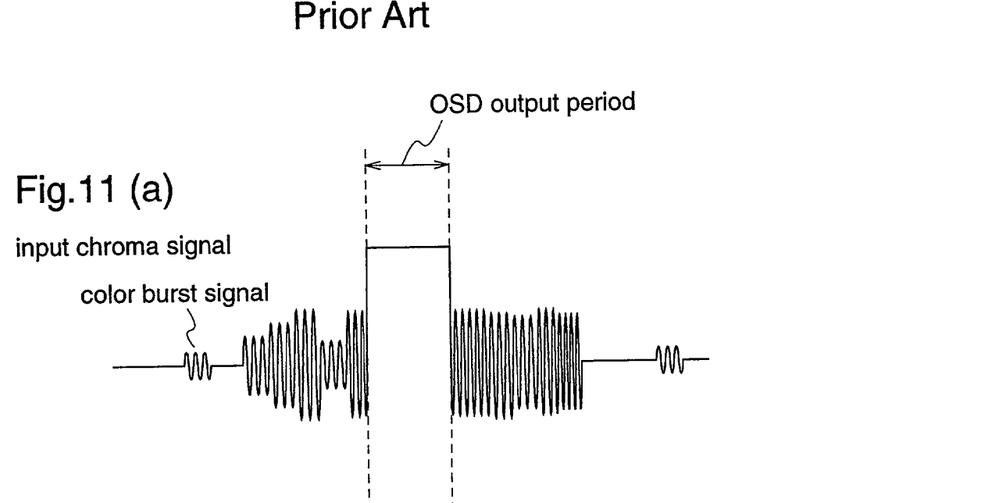
FIG. 11(a) is a waveform diagram showing a chroma signal which is inputted to the amplifier circuit and FIG. 11(b) is waveform diagram showing a chroma signal which is outputted from the amplifier circuit.

FIG. 10 is a circuit diagram illustrating an example of an amplifier circuit. FIG. 11(a) is a waveform diagram showing a chroma signal inputted to the amplifier circuit. FIG. 11(b) is a waveform diagram showing a chroma signal outputted from the amplifier circuit.

The operation of the amplifier circuit shown in FIG. 10 will be described with reference to FIGS. 11(a) and 11(b).

In a period A~B before the OSD period, the output chroma signal (FIG. 11(b)) has a waveform that is obtained by inverting the input chroma signal (FIG. 11(a)) along a voltage value VOB which is decided by resistors R1 to R4 in FIG. 10 and the like, and amplifying the inverted chroma signal.

At point B as the start point of the OSD period, the difference in level of the input signal (FIG. 11(a)) is inverted with respect to VOB and amplified, and thus the output chroma signal (FIG. 11(b)) has a waveform in the downward direction on the negative side. Until point C, the input chroma signal (FIG. 11(a)) does not vary, while the base of a transistor Tr in FIG. 10 has a higher voltage value than a voltage value decided by resistors R1 and R2, and the discharge current flows from a capacitor C to the resistors, so that the voltage value at the base decreases gently until it becomes the same voltage as the voltage value decided by the resistors R1 and R2. Thus, although there is no variation in the input chroma signal (FIG. (a)), the output chroma signal (FIG. 11(b)) varies gently from the negative value at the point B up to VOB at the point C.

In a period C~D as the latter half of the OSD period, there is no variation in the input chroma signal (FIG. 11(a)) and thus there is no variation in the output chroma signal (FIG. 11(b)) either.

At the point D as the end of the OSD period, the input chroma signal (FIG. 11(a)) has an output difference of the OSD image, and the output chroma signal (FIG. 11(b)) has a positive value as the inverted and amplified value of the difference. Until point E, the base of the transistor Tr in FIG. 10 has a lower value than the voltage value decided by the resistors R1 and R2, then the charge current flows from the resistors to the capacitor C, and the amplifier circuit is in a state inverted from the state in the period B~C. Accordingly, the voltage value at the base gently increases until it becomes the same voltage as the voltage value decided by the resistors R1 and R2. Further, since the input chroma signal (FIG. 11(a)) varies (because it has AC components), these variations are added, whereby the output chroma signal has such a waveform that the inverted and amplified AC components of the input chroma signal and the inverted and amplified output difference of the OSD image gently shift to VOB, as shown in FIG. 11(b).

During the last period E~F, as in the period A~B, the output chroma signal (FIG. 11(b)) has a waveform that is obtained by inverting the input chroma signal (FIG. (a)) with respect to VOB and amplifying the inverted chroma signal.

Display of the output chroma signal shown in FIG. 11(b) on the screen will be described.

The color is decided by hue and chroma and, generally, the hue is decided by a phase difference from the color burst signal and the chroma is decided by the amplitude ratio to the color burst signal.

In the period A~B, according to the method for deciding the hue or chroma, by slicing the signal by VOB, the phase as a basis of color burst (for example 0°, 180°) is obtained and subsequently the phase difference at a point intersecting the same VOB can be obtained, thereby deciding the hue. Further, the amplitude ratio at the maximum amplitude with respect to VOB can be obtained, thereby also deciding the chroma. Thus, both of the hue and the chroma are decided and the color can be determined.

However, in the period B~C immediately after the start of the OSD period, the phase difference cannot be obtained. Therefore, the erroneous display of the color occurs.

During the period C~D, the amplitude ratio can be decided, whereby it can be determined that no color is included.

On the other hand, also in the period D~E after the end of the OSD period, the phase difference with respect to VOB and the amplitude ratio cannot be obtained, whereby the color is erroneously displayed.

Then, in the period E~F, the color can be displayed normally again.

As described above, during the OSD period and immediately after the OSD period, the color cannot be displayed normally.

The prior art OSD device can be constituted so as to prevent the above-mentioned problems.

Figure 12:
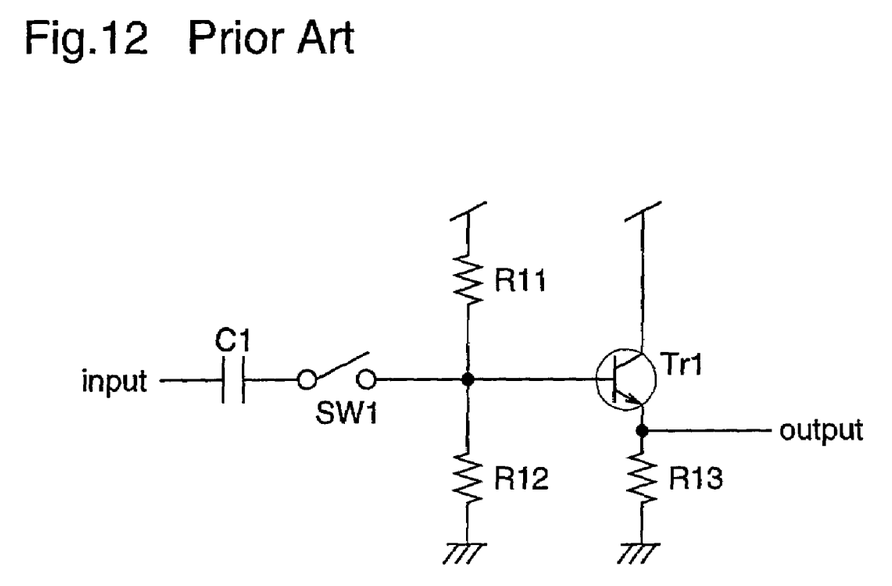
FIG. 12 is a circuit diagram illustrating a structure of the prior art OSD device.

FIG. 12 is a circuit diagram illustrating a structure of such a prior art OSD device. In FIG. 12, the structure of the prior art OSD device which performs OSD especially on a chroma signal will be described.

This prior art OSD device is constituted by a capacitor C1 placed on a chroma signal input side, an analog switch SW1 which is placed behind the capacitor C1 and works at high speeds, resistors R11, R12 and R13, and a transistor Tr1.

The resistors R11 and R12 are bias circuits and decide a bias point of the transistor Tr1 by dividing the supply voltage. The capacitor C1 is a coupling capacitor and plays a role of accommodating a divergence between the bias value of the input chroma signal and a bias generated in the prior art OSD device. Since the transistor Tr1 and the resistor R13 constitute an emitter-follower, the impedance is higher at the input and the impedance is lower at the output. In this prior art, the description is given of an emitter-follower, while of course a source-follower using a field-effect transistor or a follower circuit using an OP amplifier may be used.

Next, the operation of the prior art OSD device will be described.

The switch SW1 is closed during a period other than the OSD period. Therefore, the base of the transistor Tr1 has a voltage that is obtained by superimposing AC components of the input chroma signal upon the voltage divided by the resistors R11 and R12. Then, the output of the prior art OSD device shown in FIG. 12 has a voltage value which is reduced by the follower circuit that is constituted by the transistor Tr1 and the resistor R13, from the base voltage by a base-emitter voltage Vbe (about 0.7V) of the transistor Tr1. Therefore, the AC components of the input chroma signal are outputted in a state where there is no difference from the input, while the bias point shifts to a voltage value represented by the following Formula (1).

$$((\text{Supply voltage}) \times R12/(R11+R12))-0.7 \qquad \text{Formula (1)}$$

During the OSD period, the switch SW1 is open. Therefore, the AC components of the input chroma signal are not superimposed upon the output, and a voltage value which is reduced from the voltage that is decided by the resistors R11 and R12 by the base-emitter voltage Vbe of the transistor Tr1 is outputted.

As described above, whether in a period other than the OSD period or during the OSD period, both of the bias voltages have values represented by the above Formula (1), whereby the difference in the DC level (potential) due to the OSD is not produced.

However, assuming a case where the supply voltage includes many noises, the noises of the supply voltage enter the bias voltage due to the bias circuit that is constituted by the resistors R11 and R12. Further, the base of the transistor Tr1 has extremely high impedance and is easily affected by surrounding noises.

This presents quite a large problem particularly in the LSI in which logic circuits having supply voltages including many noises are mixed or the like. Further, the capacitor C1 as a coupling capacitor (normally about 1000 PF) is also required. Such a capacitor value cannot be contained in the LSI, whereby the number of external components is increased, resulting in an increased peripheral circuit scale. Furthermore, the bias voltage is decided by the resistors R11 and R12 and the capacitor C1 and then the LSI becomes a time-constant RC circuit, whereby the followability is not high at the variations of the input.

SUMMARY OF THE INVENTION

The present invention has for its object to provide an OSD device which can eliminate variations in the DC level at a time when an input chroma signal and an OSD chroma signal are switched, prevent an erroneous display of color without increasing the circuit scale, and further which is hardly affected by noises resulting from the supply voltage, intrusion of external noises or the like.

Other objects and advantages of the present invention will become apparent from the detailed description and specific embodiments described are provided only for illustration since various additions and modifications within the spirit and scope of the invention will be apparent to those of skill in the art from the detailed description.

According to a 1st aspect of the present invention, there is provided an on-screen display apparatus which holds a voltage value at a time when an input chroma signal is a null signal and outputs the voltage value during an on-screen display period. Therefore, variations in the DC level at the switching between the input chroma signal and the OSD chroma signal can be eliminated, thereby preventing erroneous display of color.

According to a 2nd aspect of the present invention, there is provided an on-screen display apparatus which holds a voltage value at a time when an input chroma signal is a null signal and outputs a chroma signal generated on the basis of the voltage value during an on-screen display period. Therefore, variations in the DC level at the switching between the input chroma signal and the OSD chroma signal can be eliminated, thereby preventing erroneous display of color, as well as the OSD image can be colored.

According to a 3rd aspect of the present invention, there is provided an on-screen display apparatus comprising: a voltage holding means for holding a voltage value at a time when an input chroma signal is a null signal; and an output switch for outputting the voltage value held by the voltage holding means during an on-screen display period and outputting the input chroma signal other than the on-screen display period. Therefore, variations in the DC level at the switching between the input chroma signal and the OSD chroma signal can be eliminated, thereby preventing erroneous display of color.

According to a 4th aspect of the present invention, there is provided an on-screen display apparatus comprising: a voltage holding means for holding a voltage value at a time when an input chroma signal is a null signal; an AC component generation means for generating AC components of the chroma signal; an adder for adding the voltage value held by the voltage holding means and the AC components of the chroma signal which are generated by the AC component generation means; and an output switch for outputting the signal added by the adder during an on-screen display period and outputting the input chroma signal other than the on-screen display period. Therefore, variations in the DC level at the switching between the input chroma signal and the OSD chroma signal can be eliminated, thereby preventing erroneous display of color, as well as the OSD image can be colored.

According to a 5th aspect of the present invention, in the on-screen display apparatus of the 3rd aspect, the voltage holding means comprises: an AD converter for converting an input chroma signal into a digital signal when the input chroma signal is a null signal; a storage means for storing a voltage value at the time when the input chroma signal is a null signal, which has been converted into a digital signal by the AD converter; and a DA converter for converting the voltage value stored in the storage means into an analog signal. Therefore, variations in the DC level at the switching between the input chroma signal and the OSD chroma signal can be eliminated, thereby preventing erroneous display of color, as well as when an existing AD converter or DA converter is used, the voltage holding means can be easily constituted at lower costs.

DETAILED DESCRIPTION OF THE PREFERRED EMBODIMENTS

[Embodiment 1]

Hereinafter, an OSD device according to a first embodiment of the present invention will be described with reference to the drawings. Here, the structure of the OSD device that performs on-screen display (hereinafter abbreviated as OSD) on a luminance signal is the same as that of the prior art OSD device. Thus, in this first embodiment, the structure of the OSD device that performs OSD on a chroma signal will be specifically described.

Figure 1:
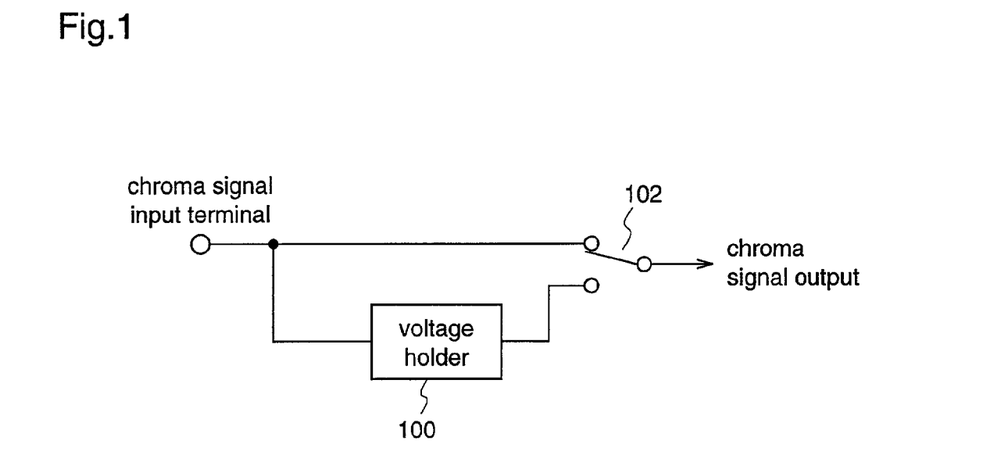
FIG. 1 is a block diagram illustrating a structure of an OSD device according to a first embodiment of the present invention.

FIG. 1 is a block diagram illustrating the structure of the OSD device according to the first embodiment.

In FIG. 1, the OSD device of the first embodiment comprises a voltage holder 100 which holds a voltage value at a time when an input chroma signal is a null signal, and an output switch 102 which selects the voltage holder 100 side during an OSD period to output the voltage value held by the voltage holder 100 and selects a chroma signal input terminal side other than the OSD period to output the input chroma signal. Here, assume that the time when the input chroma signal is a null signal is the horizontal sync period.

Figure 2:
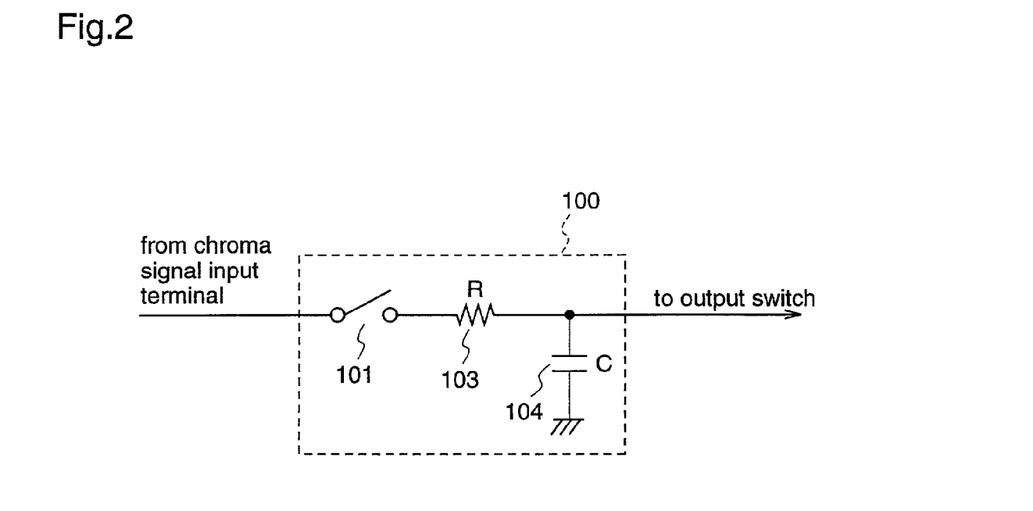
FIG. 2 is a circuit diagram illustrating a structure of a voltage holder according to the first embodiment.

FIG. 2 is a circuit diagram illustrating the structure of the voltage holder 100.

In FIG. 2, the voltage holder 100 includes a hold timing switch 101, a resistor 103, and a capacitor 104. The hold timing switch 101 is placed on the chroma signal input side of the resistor 103 and brought into conduction when the input chroma signal is a null signal. Further, the capacitor 104 holds the voltage value at the time when the input chroma signal is a null signal. Here, a period of time during which the capacitor 104 is charged is decided on the basis of a time constant that is obtained from a resistance value R of the resistor 103 and a capacitance value C of the capacitor 104. In this first embodiment, since the voltage value is held in the horizontal sync period, the time constant is selected so that the capacitor 104 is charged during this horizontal sync period. On the other hand, when a small time constant is set to charge the capacitor too quickly, the voltage value becomes sensitive to noises or the like, whereby there is a possibility that the voltage value at the null signal cannot be held correctly. Therefore, it is necessary to set the time constant properly according to the standards of a video signal and the property of the video equipment.

For example, since there is a predetermined blanking interval before the video is displayed on a screen, it is not required to complete the charge of the capacitor 104 during one horizontal sync period. Thus, it is also possible to complete the charge before the video is displayed on the screen, by employing several horizontal sync periods in the blanking interval.

Further, for example upon power-up or switching of video sources, it is common that the video signal is muted during its transition period. Therefore, the time constant may be selected so as to complete the charge during the mute period.

Further, in FIG. 2, a follower circuit may be provided between the capacitor 104 and the output switch 102. This reduces the capacity value of the capacitor 104 and when it outputs at lower impedance, the superimposition of noises can be decreased.

Next, the operation of the OSD device according to the first embodiment will be described. Here, the operation of performing OSD on a luminance signal is the same as that in the prior art OSD device.

FIGS. 3(a) to 3(f) are diagrams for explaining a case where the OSD is performed on a chroma signal.

Figure 3:
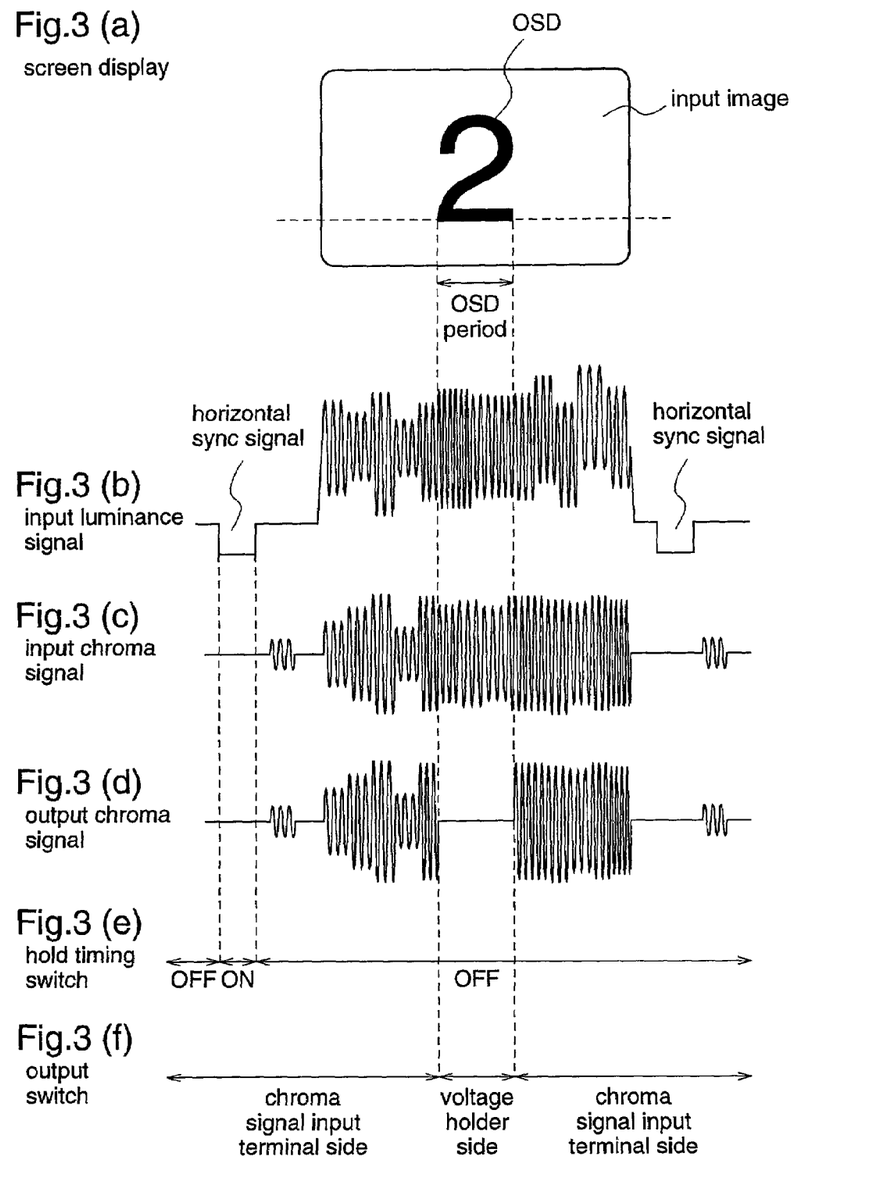
FIGS. 3(a) to 3(f) are diagrams for explaining a case where OSD is performed on a chroma signal in the first embodiment.

The description will be given of a case where an OSD image is displayed along a horizontal dashed line in FIG. 3(a). In FIG. 3(a), input video other than the OSD image is not shown while assuming here that there is predetermined input video behind the OSD image.

FIG. 3(b) is a waveform diagram showing an input luminance signal. FIG. 3(c) is a waveform diagram showing an input chroma signal. FIG. 3(d) is a waveform diagram showing an output chroma signal. FIG. 3(e) is a diagram for explaining the operation of the hold timing switch 101. FIG. 3(f) is a diagram for explaining the operation of the output switch 102.

As can be seen from the FIGS. 3(b) and 3(c), the chroma signal is a null signal during the horizontal sync period. Therefore, the voltage holder 100 holds the voltage value of the input chroma signal in this horizontal synch period. The output switch 102 outputs the held voltage as a chroma signal in the OSD period.

During the horizontal sync period, the hold timing switch 101 is turned ON. Then, the voltage value of the input chroma signal at that time is held in the capacitor 104. On the other hand, the hold timing switch 101 is OFF other than the horizontal sync period.

A signal controlling the operation of the hold timing switch 101 can be generated using a horizontal sync separation circuit (not shown) for separating a sync signal from the input luminance signal. Here, a sync signal which is separated by the horizontal sync separation circuit from an input composite video signal of the same video source as that of the S-Video signal may be used.

In a period during which the OSD image is displayed on the screen, i.e., during the OSD period, the output switch 102 selects the voltage holder 100 side, so that the voltage value held by the voltage holder 100 is outputted as a chroma signal output.

On the other hand, in a period other than the OSD period, the output switch 102 selects the chroma signal input terminal side, so that the inputted chroma signal is outputted as it is as the chroma signal output.

Therefore, the output chroma signal outputted from the output switch 102 has a waveform as shown in FIG. 3(d), and thus a DC level at a time when the input chroma signal is a null signal is equal to a DC level during the OSD period.

As described above, the OSD device according to the first embodiment comprises the voltage holder 100 which holds a voltage value at a time when an input chroma signal is a null signal, and the output switch 102 which outputs the voltage value held by the voltage holder 100 in the OSD period and outputs the input chroma signal other than the OSD period. Therefore, variations in the DC level at a time when the input chroma signal and the OSD chroma signal are switched can be eliminated, thereby preventing erroneous display of the color. Further, since the input chroma signal passes through the output switch 102 with lower impedance, it is hardly affected by surrounding noises and the original signal is outputted without noises being added thereto like the bias circuit, even when the power supply or GND includes noises. Besides, since the chroma signal output in the OSD period is a charge voltage of the capacitance 104 with reference only to the GND voltage, it is not affected by noises on the supply voltage side. Further, even when the DC level at the time when the input chroma signal is a null signal varies, the voltage value can be sampled in one horizontal sync period in the fastest case. Therefore, the followability of the voltage value in the OSD period to the variations in the DC level is high and thus the accurate display can be performed quickly.

When the chroma signal input terminal is an external terminal of a semiconductor, there is a risk of a transistor which constitutes the hold timing switch 101 shown in FIG. 2 being damaged by an external static electricity. Thus, the positions of the hold timing switch 101 and the resistor 103 can be switched in FIG. 2, so as to place the hold timing switch 101 between the resistor 103 and the capacitor 104. When the hold timing switch 101 and the resistor 103 are switched, the resistor 103 acts as a protection resistor.

Further, in this first embodiment, the hold timing switch 101 is controlled for being brought into conduction in the horizontal sync period. However, the hold timing switch 101 may be controlled using a signal outside the horizontal sync period, which is activated at a time when the input chroma signal is a null signal, for example a vertical sync signal, for being brought into conduction in that period (for example a vertical sync period).

Furthermore, when the period of time in which the voltage holder 100 shown in FIG. 2 is charged is set sufficiently long, the hold timing switch 101 may be deleted. Even if an input chroma signal inputted to the voltage holder 100 has AC components, when the charge time is sufficiently long, the held voltage value has an approximately constant value, whereby the voltage holder 100 can output the voltage value in the OSD period. When the hold timing switch 101 is provided, the resistor 103 may be deleted.

[Embodiment 2]

Hereinafter, an OSD device according to a second embodiment of the present invention will be described with reference to the drawings. The OSD device according to the second embodiment generates a chroma signal that is outputted during the OSD period, on the basis of the held voltage value, thereby coloring the OSD image.

Figure 4:
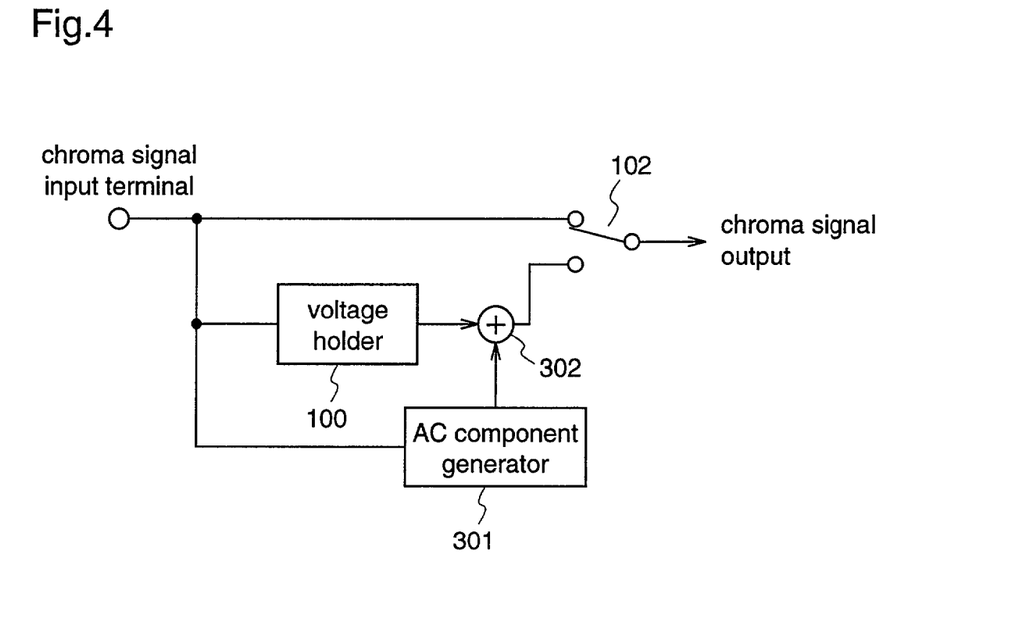
FIG. 4 is a block diagram illustrating a structure of an OSD device according to a second embodiment of the present invention.

FIG. 4 is a block diagram illustrating a structure of the OSD device according to the second embodiment.

In FIG. 4, the OSD device of the second embodiment comprises a voltage holder 100, an output switch 102, an AC component generator 301, and an adder 302. Here, the voltage holder 100 and the output switch 102 are the same as those in the first embodiment.

The AC component generator 301 generates AC components of a chroma signal. The adder 302 adds the AC components of the chroma signal, generated by the AC component generator 301, and a voltage value held by the voltage holder 100.

Next, the operation of the OSD device according to the second embodiment will be described. The operation of the voltage holder 100 for holding the voltage value at a time when the input chroma signal is a null signal is the same as that in the first embodiment.

The AC component generator 301 extracts a color burst signal of an input chroma signal inputted from a chroma signal input terminal, and generates AC components of the chroma signal corresponding to a predetermined color on the basis of the color burst signal.

The adder 302 adds the AC components of the chroma signal from the AC component generator 301, and the voltage value held by the voltage holder 100. Therefore, a chroma signal whose DC level is the voltage value held by the voltage holder 100 and whose AC components are generated by the AC component generator 301 is outputted from the adder 302.

The output switch 102, like in the first embodiment, selects the adder 302 side during the OSD period to output the output signal of the adder 302, and selects the chroma signal input terminal side other than the OSD period to output the input chroma signal.

As described above, the OSD device according to the second embodiment comprises the voltage holder 100 that holds a voltage value at a time when an input chroma signal is a null signal, the AC component generator 301 that generates AC components of the chroma signal, the adder 302 that adds the voltage value held by the voltage holder 100 and the AC components of the chroma signal generated by the AC component generator 301, and the output switch 102 that outputs a signal added by the adder 302 during the OSD period and outputs the input chroma signal other than the OSD period. Therefore, the OSD image can be colored, as well as the effects of the first embodiment can be obtained.

[Embodiment 3]

Hereinafter, an OSD device according to a third embodiment of the present invention will be described with reference to the drawings. The OSD device of the third embodiment has a voltage holder which is constituted by a storage means (register).

Figure 5:
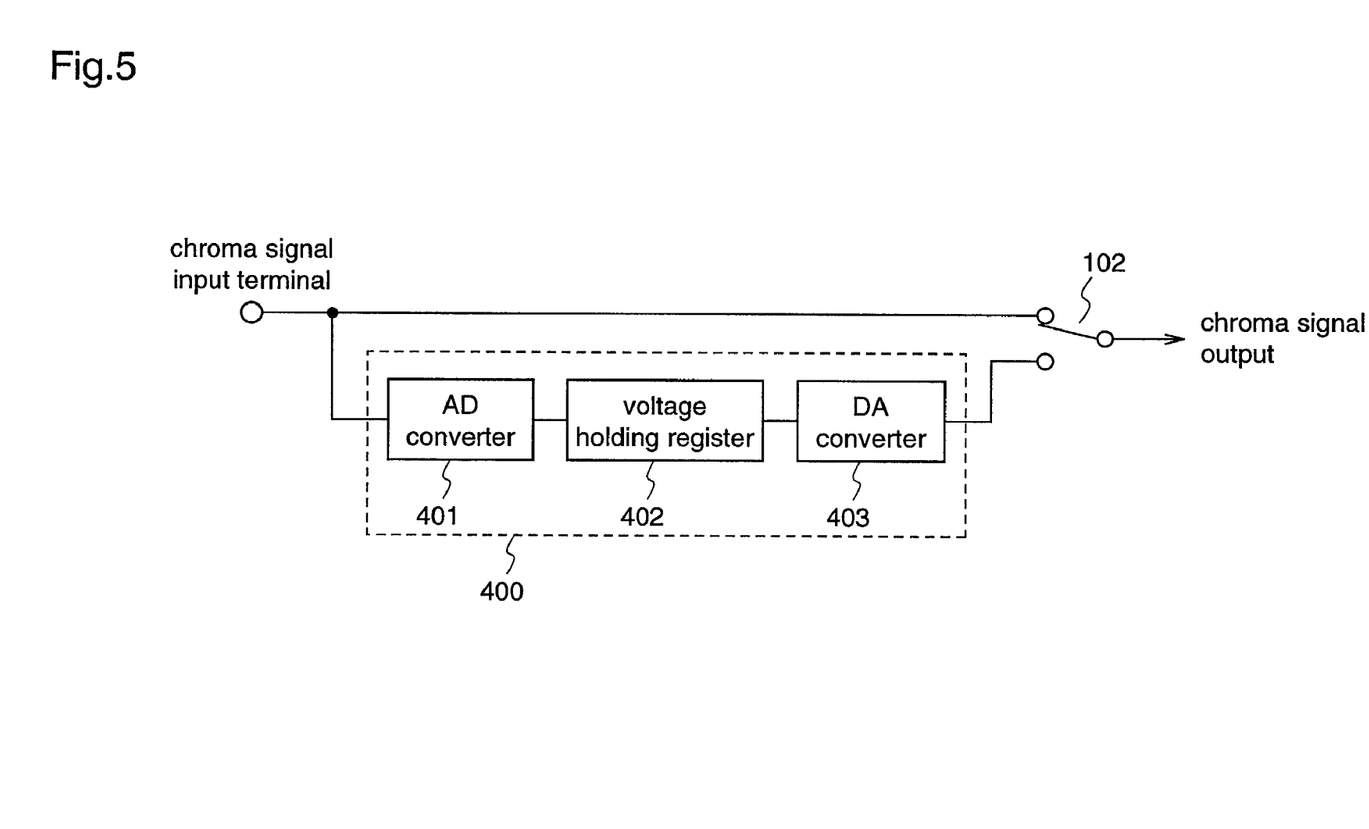
FIG. 5 is a block diagram illustrating a structure of an OSD device according to a third embodiment of the present invention.

FIG. 5 is a block diagram illustrating a structure of an OSD device of the third embodiment.

In FIG. 5, the OSD device according to the third embodiment comprises a voltage holder 400 and an output switch 102. The output switch 102 is the same as that of the first embodiment.

The voltage holder 400 comprises an AD converter 401 that converts an input chroma signal into a digital signal when the input chroma signal is a null signal, a voltage holding register 402 that holds a voltage value at the time when the input chroma signal is a null signal, which has been converted into the digital signal by the AD converter 401, and a DA converter 403 that converts the voltage value held by the voltage holding register 402 into an analog signal.

Next, the operation of the OSD device according to the third embodiment will be described.

The AD converter 401 converts an input chroma signal as an analog signal into a digital signal at a timing when the input chroma signal becomes a null signal (for example, timing of a horizontal sync period detected by a horizontal sync signal of an input video signal).

The voltage holding register 402 holds a voltage value at the time when the input chroma signal is a null signal, which is the digital value converted by the AD converter 401.

The DA converter 403 converts the voltage value as the digital value held by the voltage holding register 402 into an analog signal.

Then, when the output switch 102 selects the voltage holder 400 side in the OSD period, the voltage value as the analog signal converted by the DA converter 403 is outputted as a chroma signal output. Here, the operation of the output switch 102 for selecting the chroma signal input terminal side other than the OSD period to output the input chroma signal as it is as the chroma signal output is the same as that in the first embodiment.

In this third embodiment, the AD converter 401 is required, while it is not always necessary to provide a special AD converter 401 but an AD converter included in a normal video device can be used in a period during which the AD converter is not used, thereby holding a null signal level of the input chroma signal. Since variations in the null signal level are small in a period during which video of the same video source is being displayed, it can be assumed that the operation of holding the voltage value can be carried out in a period during which the existing AD converter is not used.

As described above, the OSD device according to the third embodiment comprises the voltage holder 400 that is constituted by the AD converter 401 which converts the input chroma signal into a digital signal when the input chroma signal is a null signal, the voltage holding register 402 which holds the voltage value at the time when the input chroma signal is a null signal, which has been converted into the digital signal by the AD converter 401, and the DA converter 403 which converts the voltage value held by the voltage holding register 402 into an analog signal. Therefore, when an AD converter included in a normal video device is used as the AD converter 401, the voltage holder 400 can be easily constituted by only providing the voltage holding register 402 and the DA converter 403 in the normal video device, as well as the same effects as those in the first embodiment can be obtained.

Figure 6:
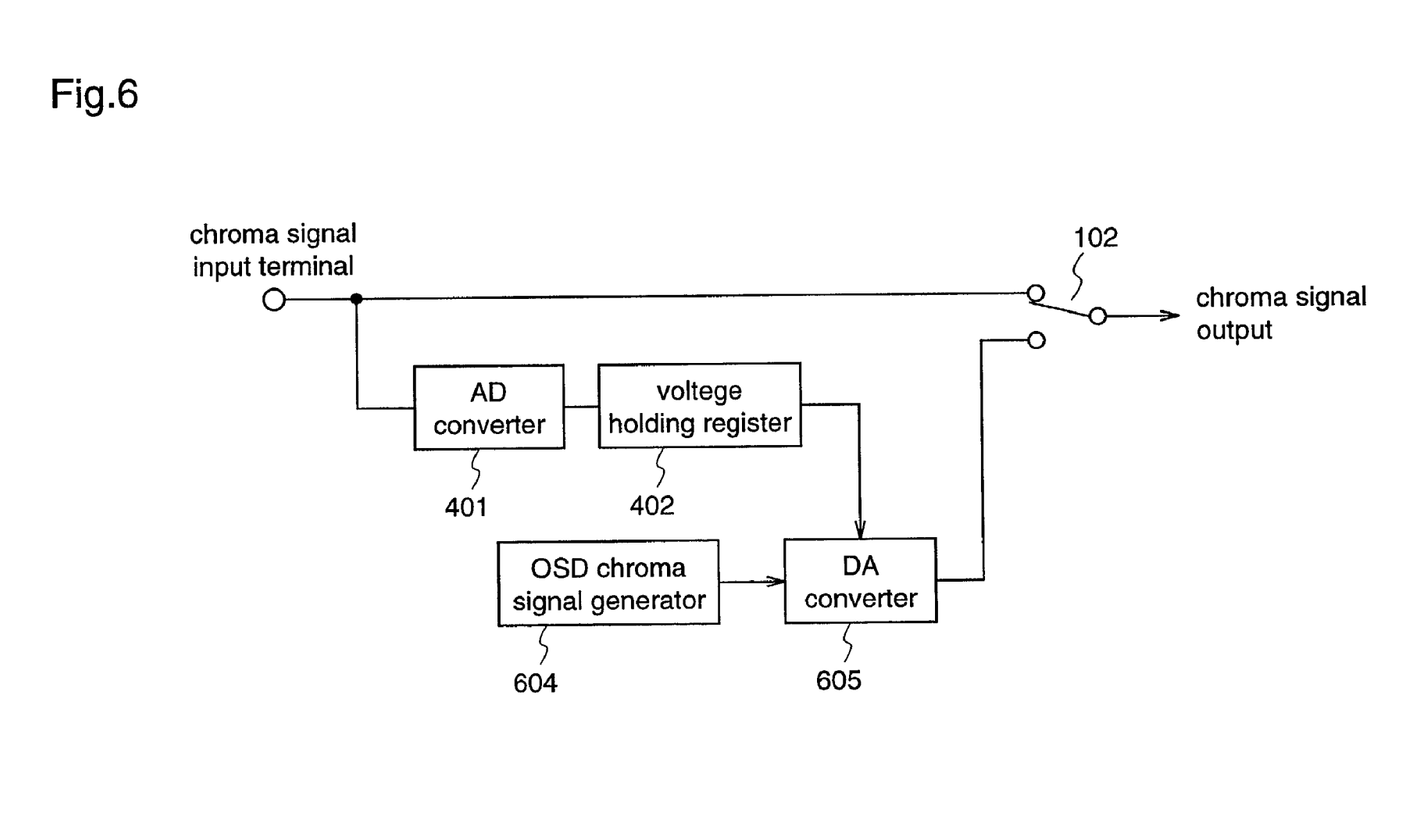
FIG. 6 is a block diagram illustrating a structure of an OSD device according to the third embodiment of the present invention.

Here, the DA converter 605 included in the prior art OSD device as shown in FIG. 6 may be used as the DA converter 403. When the DA converter is thus commonly used, the voltage holder 400 according to the third embodiment can be constituted without providing a special DA converter in the prior art OSD device.

Further, in this third embodiment, the voltage holder 100 according to the first embodiment is constituted by a register, while the voltage holder 100 according to the second embodiment may be constituted by a register as described in the third embodiment.

Further, it is apparent that the present invention can be applied to a composite video signal or a luminance signal. For example, when the level of a horizontal sync signal is held at a timing of the horizontal sync signal, an OSD signal can be created with reference to the level of the horizontal sync signal of an input signal.

What is claimed is:

1. An on-screen display apparatus comprising:
   a voltage holding means for holding a voltage value of an input chroma signal DC level within a period during which the input chroma signal has a null value and outputting the held voltage value during an on-screen display period, reducing variations in the DC level when switching between the input chroma signal and an on-screen display signal, the voltage holding means comprising:
      an AD converter for converting an input chroma signal into a digital signal when the input chroma signal has a null value;
      a storage means for storing a voltage value of the input chroma signal within a period during which the input chroma signal has a null value, which has been converted into a digital signal by the AD converter; and
      a DA converter for converting a voltage value stored in the storage means into an analog signal.

2. An on-screen display apparatus comprising:
   a voltage holding means for holding a voltage value at of an input chroma signal DC level within a period during which the input chroma signal has a null value, the voltage holding means comprising:
      an AD converter for converting an input chroma signal into a digital signal when the input chroma signal has a null value;
      a storage means for storing a voltage value of the input chroma signal within a period during which the input chroma signal has a null value, which has been converted into a digital signal by the AD converter; and
      a DA converter for converting a voltage value stored in the storage means into an analog signal; and
   a means for generating and outputting a chroma signal as a function of the held voltage value during an on-screen display period, reducing variations in the DC level when switching between the input chroma signal and an on-screen display signal.

3. An on-screen display apparatus comprising:
   a voltage holding means for holding a voltage value at of an input chroma signal DC level within a period during which the input chroma signal has a null value, the voltage holding means comprising:
      an AD converter for converting an input chroma signal into a digital signal when the input chroma signal has a null value;
      a storage means for storing a voltage value of the input chroma signal within a period during which the input chroma signal has a null value, which has been converted into a digital signal by the AD converter; and
      a DA converter for converting a voltage value stored in the storage means into an analog signal; and
   an output switch for outputting a voltage value held by the voltage holding means during an on-screen display period and outputting the input chroma signal at a period except for the on-screen display period, reducing variations in the DC level when switching between the input chroma signal and an on-screen display signal.

4. The on-screen display apparatus of claim 3, wherein the voltage holding means comprises a capacitor for holding a voltage value.

5. The on-screen display apparatus of claim 4, wherein the voltage holding means further comprises a resistor located on a chroma signal input side of the capacitor.

6. The on-screen display apparatus of claim 5, wherein the voltage holding means is placed on a chroma signal input side of the resistor, and further comprises a hold timing switch that is brought into conduction when the input chroma signal has a null value.

7. The on-screen display apparatus of claim 5, wherein the voltage holding means is placed between the capacitor and the resistor, and further comprises a hold timing switch that is brought into conduction when the input chroma signal has a null value.

8. The on-screen display apparatus of claim 3, wherein the voltage holding means is for holding the voltage value during a horizontal sync period during which the input chroma signal has a null value.

9. The on-screen display apparatus of claim 3, wherein the voltage holding means is for holding the voltage value during a vertical sync period during which the input chroma signal has a null value.

10. An on-screen display apparatus comprising:
    a voltage holding means for holding a voltage value at a time when an input chroma signal is a null signal;
    an AC component generation means for generating AC components of the chroma signal;
    an adder for adding the voltage value held by the voltage holding means and the AC components of the chroma signal which are generated by the AC component generation means; and
    an output switch for outputting the signal added by the adder during an on-screen display period and outputting the input chroma signal other than the on-screen display period.

* * * * *